(12) United States Patent
Wang (10) Patent No.: US 11,144,748 B2
(45) Date of Patent: Oct. 12, 2021

(54) CLASSIFICATION SYSTEM

(71) Applicant: Karl L. Wang, Los Altos, CA (US)

(72) Inventor: Karl L. Wang, Los Altos, CA (US)

(73) Assignee: IOT Technology, LLC., Los Altos, CA (US)

( * ) Notice: Subject to any disclaimer, the term of this patent is extended or adjusted under 35 U.S.C. 154(b) by 175 days.

(21) Appl. No.: 16/590,274

(22) Filed: Oct. 1, 2019

(65) Prior Publication Data
US 2020/0184200 A1    Jun. 11, 2020

Related U.S. Application Data (60) Provisional application No. 62/777,023, filed on Dec. 7, 2018.

(51) Int. Cl.
*G06K 9/00* (2006.01)
*G06K 9/62* (2006.01)
(Continued)

(52) U.S. Cl.
CPC ..... *G06K 9/00288* (2013.01); *G06K 9/00268* (2013.01); *G06K 9/6227* (2013.01); *G06K 9/6257* (2013.01); *G06N 3/04* (2013.01); *G06N 3/08* (2013.01); *G06K 9/00087* (2013.01); *G06K 9/00617* (2013.01); *G06K 9/00885* (2013.01)

(58) Field of Classification Search
CPC ............. G06K 9/00288; G06K 9/6227; G06K 9/6257; G06K 9/00268; G06K 9/00885; G06K 9/00087; G06K 9/00617; G06K 9/00993; G06K 9/6271; G06N 3/08; G06N 3/04; G06N 3/082; G06N 3/0481;
(Continued)

(56) References Cited

U.S. PATENT DOCUMENTS

| 6,308,051 B1 * | 10/2001 | Atokawa ................. H01P 1/213 455/78 |
| 2002/0065044 A1 * | 5/2002 | Ito ........................ G06K 7/0008 455/41.2 |

(Continued)

OTHER PUBLICATIONS

[1] C. Szegedy, W. Liu, Y. Jia, P. Sermanet, S. Reed, D. Anguelov, D. Erhan, V. Vanhoucke, A. Rabinvovich, "Going Deeper with Convolutions," Proceedings of the IEEE Conference on Computer Visions and Pattern Recognition, 2015, pp. 1-9.

(Continued)

*Primary Examiner* — Jerome Grant, II
(74) *Attorney, Agent, or Firm* — Douglas L. Weller (57) ABSTRACT

A biometric classification system includes a biometric capture system that captures a biometric identifier. A classifier includes a plurality of group classifiers. Each group classifier in the plurality of classifiers includes a group discriminator that determines, based on the captured biometric identifier, whether the biometric identifier belongs to a group of persons associated with the group discriminator, and includes a plurality of object discriminators. Each object discriminator is associated with a single person within the group of persons. The group discriminator determines whether the biometric identifier belongs to the group of persons. The object discriminator determines whether the biometric identifier belongs to the single person associated with the object discriminator.

18 Claims, 6 Drawing Sheets

(51) Int. Cl.
*G06N 3/08* (2006.01)
*G06N 3/04* (2006.01)

(58) Field of Classification Search
CPC ...... G06N 3/0472; G06N 3/088; G06N 3/084; G06N 3/0454
USPC ........................................................ 382/118
See application file for complete search history.

(56) References Cited

U.S. PATENT DOCUMENTS

| | | | | |
|---|---|---|---|---|
| 2003/0107469 | A1* | 6/2003 | Emmerling | B60R 25/24 340/5.7 |
| 2014/0307957 | A1* | 10/2014 | Tanaka | G06K 9/4614 382/159 |
| 2014/0340425 | A1* | 11/2014 | Kawa | G09G 5/14 345/634 |
| 2017/0364769 | A1* | 12/2017 | Sandler | G06K 9/00281 |
| 2018/0173939 | A1* | 6/2018 | Howe | G06K 9/00288 |
| 2019/0019020 | A1* | 1/2019 | Flament | G06N 3/08 |
| 2019/0064929 | A1* | 2/2019 | Tomeh | H04L 12/2803 |
| 2019/0180147 | A1* | 6/2019 | Zhang | G06K 9/6215 |
| 2019/0236803 | A1* | 8/2019 | Wang | G06T 7/74 |
| 2019/0266806 | A1* | 8/2019 | Aluru | G06K 9/00281 |
| 2019/0279075 | A1* | 9/2019 | Liu | G06N 3/084 |
| 2020/0184200 | A1* | 6/2020 | Wang | G06K 9/00288 |
| 2020/0218890 | A1* | 7/2020 | Mehta | G06K 9/03 |
| 2021/0133977 | A1* | 5/2021 | Yamazaki | G06K 9/628 |
| 2021/0134022 | A1* | 5/2021 | Qin | G06K 9/00228 |

OTHER PUBLICATIONS

[2] I. Goodfellow, J. Pouget-Abadie, ZM. Mirza, B. Xu, D. Warde-Farley, S. Ozair, A. Courville, Y. Bengie, "Generative Adversarial Nets," Advances in Neural Information Processing Systems 27 (NIPS 2014).

[3] Y. LeCun, B. Boser, J. S Denker, D. Henderson, R. E Howard, W. Hubbard, L. D Jackel. "Backpropagation applied to handwritten zip code recognition," Neural Computation, vol. 1, No. 4, Winter 1989, pp. 541-551.

[4] A. Radford and L. Metz, "Unsupervised Representation Learning with Deep Convolutional Generative Adversarial Networks," ICLR 2016, arXiv:1511.06434v2 [cs.LG] Jan. 7, 2016.

[5] L. Metz, B. Poole, D. Pfau, J. Sohl-Dickstein, "Unrolled Generative Adversarial Networks," LCLR 2017, arXiv:1611 02163v4[cs LG] May 12, 2017.

* cited by examiner

CLASSIFICATION SYSTEM

RELATED APPLICATIONS

This application claims the benefit of U.S. Provisional Application No. 62/777,023 filed Dec. 7, 2018, which is herein incorporated by reference in its entirety.

BACKGROUND

In the field of machine learning, classification of objects for a large system is often accomplished with very deep neural networks, see for example C. Szegedy, W. Liu, Y. Jia, P. Sermanet, S. Reed, D. Anguelov, D. Erhan, V. Vanhoucke, A. Rabinvovich, "Going Deeper with Convolutions," Proceedings of the IEEE Conference on Computer Visions and Pattern Recognition, 2015, pp. 1-9. The very deep neural networks can be trained to recognize target objects. For example, in facial recognition, the deep neural networks are trained to recognize when a captured image is an image of a face that the very deep neural networks has been trained to recognize as belonging to a particular person. That is, the captured image of the face identifies the particular person. For tasks like facial recognition, classification can require a large computation resource. For example, a cloud-based service can provide the required computation power and data storage. However, such a solution may not be suitable for mobile applications that are limited in computing resource and where connectivity with the internet may not exist or may suffer from performance or security issues, such as often is the case with Internet of Things (IoT) implementations. Therefore, intelligent edge computing using artificial intelligence (AI) algorithms can be difficult to realize on mobile platforms.

Classification for a large group also requires a large amount of data for training a deep neural network to achieve high accuracy. For example, accurate classification of high-resolution images usually requires a large data set for training and testing purposes. This requirement is difficult to meet in a data-limited application, such as fast response surveillance or security access applications.

In order to improve the computation performance, AI solutions typically use graphics processing unit (GPU) based platforms. For example, servers using GPU solution are commonly deployed in cloud-based computation centers. However, this type of solution is usually not suitable for mobile applications. Recently, a class of integrated circuits with dedicated neural network computation units have being developed to realize intelligent edge computing. A system design that leverages this type of hardware solution can improve the classification performance for large systems.

DETAILED DESCRIPTION

A scalable system architecture enables classification to scale for a large group of objects by replicating a group classifier without using very deep neural networks. The group classifier is implemented on integrated circuits with each group classifier implemented as neural network computation units within the integrated circuit. For example, a Generative Adversarial Neural networks (GAN) is used to improve classification accuracy by using image feature enhancement in data-limited applications and to reduce data storage requirement for classification in large systems.

Figure 1:
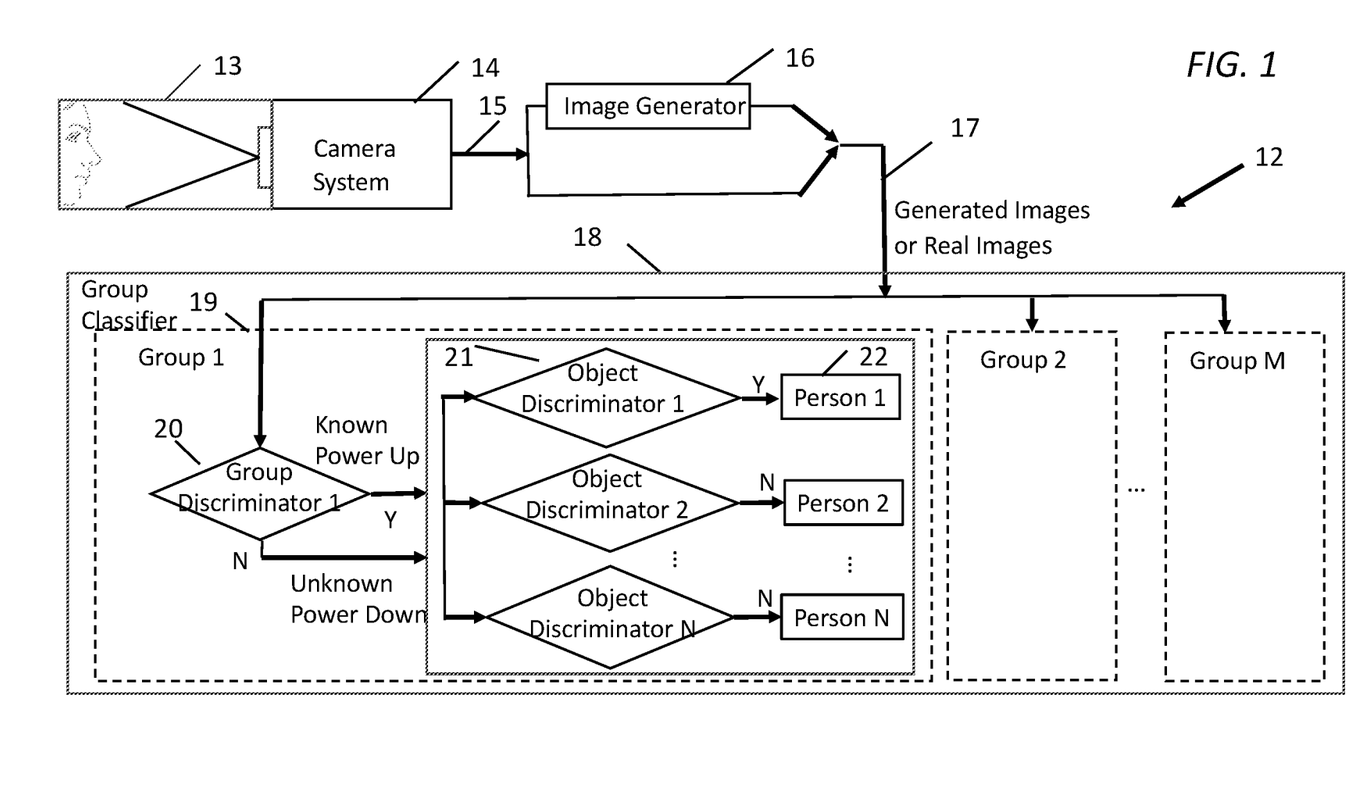
FIG. 1 is an illustration of a classification system architecture for a security entry application in accordance with an implementation.

FIG. 1 shows a classification system architecture 12 for a security entry application. For example, the face of a person 13 seeking entry is scanned by a camera system 14. A facial image 15 is captured by the camera system 14. Camera system 14 forwards facial image 15 to an image generator 16 or directly to the real image 17. The image generator 16 outputs generated images 17, which are feature enhanced images of the person 13 to a classifier 18. The classifier 18 consists of multitude of group classifiers (labeled group 1 to group M), each similar to a group classifier 19. For example, each group classifier is implemented as a separate neural network computation unit within an integrated circuit.

The group classifier 19 consists of a group discriminator 20 that is connected to a multitude of object discriminators 21 (labeled object discriminator 1 to object discriminator N). If one of the group discriminators determines that the images 17 (real or generated) belong to the group for that group discriminator, the images 17 are further classified by the object discriminators within the group. The object discriminators 21 each classify multitude of persons 22 (person 1 to N) in a group. When one object discriminator 21 recognizes the images 17, that object discriminator outputs a logic one to allow entry; otherwise, otherwise that object discriminator outputs a logic zero to deny entry.

This classification architecture offers several performance advantages. For example, the group discriminators (group 1 to M) can classify the images in parallel to determine if the images 17 belong to a group. Each object discriminator 21 can be trained to recognize a particular person in a group, allowing a bank of object discriminators to classify in parallel persons in that group. The object discriminator 21 can be implemented using a shallower neutral network that consists of fewer numbers of layers than that of a very deep neutral network. The parallel architecture requires less computing resource since a shallow object discriminator is easier to train for classifying a person than a very deep neutral network used to classify a large group of persons. For example, object discriminators within a group classifier are on standby and powered down when the group discriminator for the group classifier determines the image of the face do not belong to the group of persons associated with the group discriminator Further, classification architecture 12 can scale for a large system comprising of a large number of persons by replicating the group classifier 19 and training it for that group. Since the classification are done in parallel in all the group classifiers, the classification process is very efficient resulting in an over-all system classification performance improvement.

The disclosed architecture 12 enables a low power classification design due to the fact that only the object discriminators 21 in a selected group classifier that the images 17 belong, are powered up in active mode while those in the other unselected groups are powered down in standby mode.

Each image generator 16 is trained to generate feature enhanced images for one person by extracting features that are unique to that person. This feature extraction is done autonomously through the GAN training.

Due to the fact that object discriminator 21 is trained to recognize a particular person and many of these connected together according to the disclosed parallel architecture are used to classify persons in a group, higher classification accuracy can be achieved than state of art.

The disclosed architecture facilitates hardware implementation by replicating the group classifier 19 as an integrated circuit block with neural network computation units, as further discussed below.

For example, the generated or real images 17 can be generated by an image generator 16 or taken directly from the camera system 14 as real images in real-time or beforehand. In either case, the generated or real images 17 is an electronic personal identifier that can be used by the classifier 18 to identify a person 13 in a group for entry purpose or any other security applications that requires a personal identification. Furthermore, the facial image classification system 12 can be generalized to classify any objects in a large group of objects using the generated or real images of the objects. In the case that generated images is not available, real images can be used instead. However, in such case the classification accuracy may be degraded because image feature enhancement embodied in the generated images would be missing in the real images.

Figure 2:
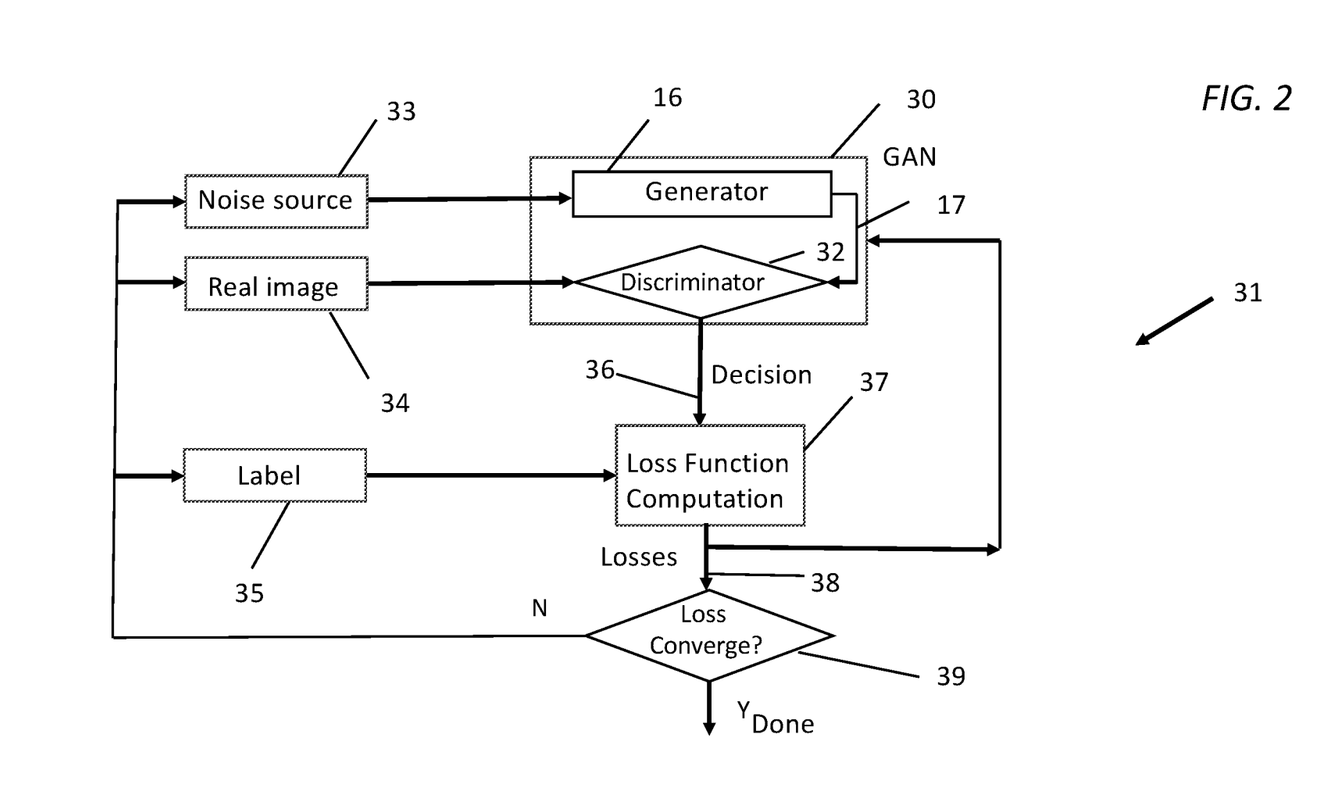
FIG. 2 shows a flow diagram of an algorithm for training a generative adversarial networks (GAN) to derive an image generator in accordance with an implementation.

Instead of, or in addition to, facial images, the classification system 12 can use other biometric identifiers that are associated with a person. For example, the classification system 12 can use fingerprint, retina scan, voice pattern, body motion patterns, or any other biometric identifiers that can be used to identify an individual. For example, for some of the biometric identifiers, the image generator 16 is replaced by a biometric generator with similar functions as the image generator, FIG. 2 is an illustration of a flow diagram 31 of an algorithm that can be used for training a generative adversarial networks (GAN) 30 to derive the image generator 16 shown in FIG. 1. For example, the image generator 16 is trained within a generative adversarial network using a set of facial image data from persons within the group of persons. For background information on generative adversarial networks, see for example I. Goodfellow, J. Pouget-Abadie, Z M. Mirza, B. Xu, D. Warde-Farley, S. Ozair, A. Courville, Y. Bengie, "Generative Adversarial Nets," Advances in Neural Information Processing Systems 27 (NIPS 2014).

GAN 30 consists of a generator 16 and a discriminator 32. The generated images 17 using image generator 16 are referred to as fake images that are generated from a uniformly distributed noise source 33. The discriminator 32 is alternately fed generated fake images 17 and real images 34 in an iterative optimization process. The task of the discriminator is to make a decision 36 to determine if the input is a real image 34 or a generated fake image 17. The correctness of the decision 36 can be computed by loss functions 37 by comparing the decision 36 with a label 35 that indicates if the input is a fake image or a real image. The loss function can be expressed as losses given by the following equation:

$$D\_loss = -mean(\log(D\_real) + \log(1.-D\_fake))$$

$$G\_loss = -mean(\log(D\_fake))$$

where $D\_real = D(x)$ is the discriminator output for real image; $D\_fake = D(G(z))$ is the discriminator output for generated fake image; and the mean losses are taken over a batch of training samples.

The losses 38 are feedback to GAN 30 to optimize the model parameters using a backward propagation training process to achieve minimums for the losses. For an example of backward propagation training, see Y. LeCun, B. Boser, J. S Denker, D. Henderson, R. E Howard, W. Hubbard, L. D Jackel. "Backpropagation applied to handwritten zip code recognition," Neural Computation, vol. 1, no. 4, Winter 1989, pp. 541-551. The computed losses 38 are evaluated for convergence 39. If these have converged to stable values, then the optimization process ends; otherwise, the iteration cycles continue with an additional set of training data. Using this optimization process, an image generator 16 is optimized to generate images 17 that look alike the real images 34. The resulting generator is the image generator 16.

Figure 3:
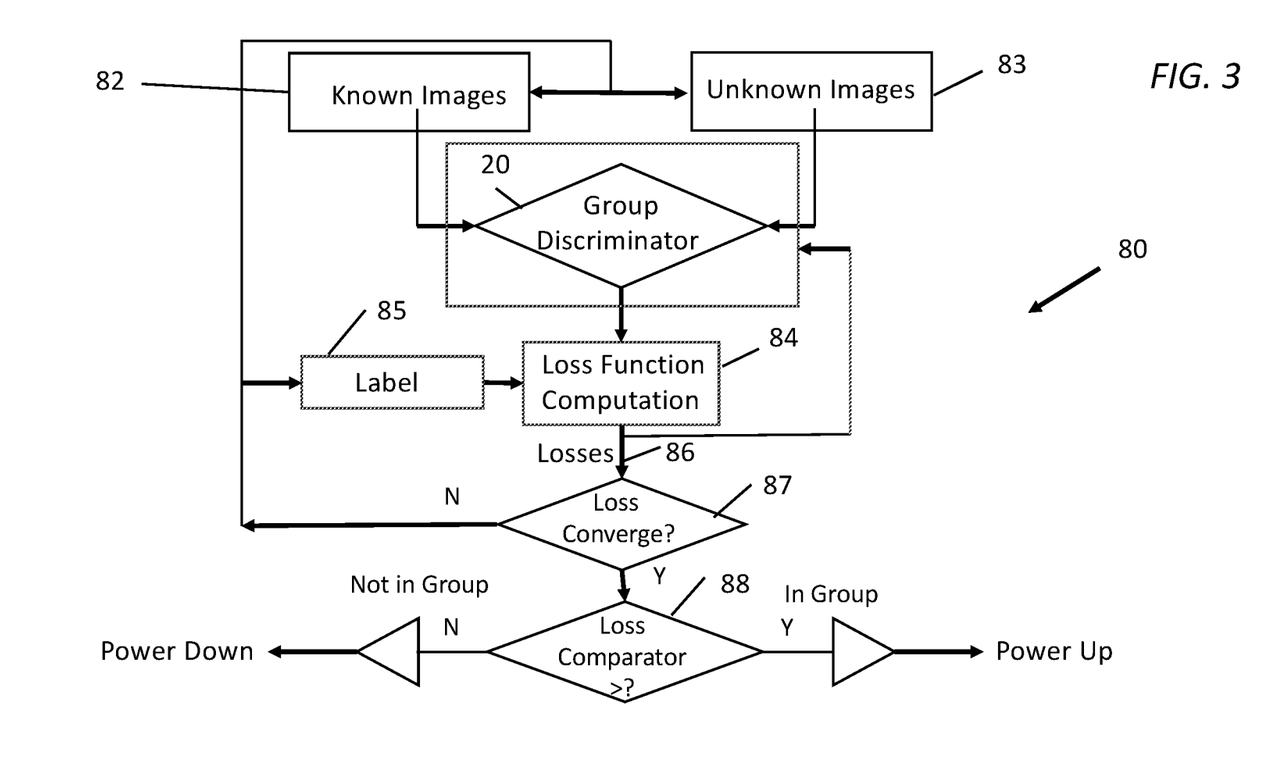
FIG. 3 shows a flow diagram of an algorithm for training a group discriminator in accordance with an implementation.

FIG. 3 is an illustration of a flow diagram 80 of an algorithm for training the group discriminator. The group discriminator 20 receives unknown images 83 and determines if they belong to the group. To make this decision, the unknown images 83 and the known images 82 that belong to the group are input to the group discriminator in iteration training cycles. The computed loss 86 can be expressed by the following equation:

$$D\_loss = -mean(\log(D\_unknown) + \log(1.-D\_known))$$

where $D\_unknown = D(x)$ is the discriminator output for unknow images; $D\_known = D(y)$ is the discriminator output for the known images that belong to the group; and the mean loss is taken over a batch of training samples.

The loss 86 is evaluated for convergence 87. If the loss 86 converges to a stable value, then the training process ends; otherwise, the iteration cycles continue with additional set of training data. Once the loss value converges, then it is compared with a threshold value 88. If the loss value is greater than a threshold value, then the unknown images 83 belong to the group and the object discriminators in that group are powered up; otherwise, it does not belong to the group and the object discriminators in that group are powered down. The reason for this result is that if the unknown images 83 belong in the group, it appears both as unknown and known inputs, causing the discriminator to output D_unknown and D_known; therefore, in this case D_loss converges to a larger value than the case that the unknown images 83 does not belong to the group.

Figure 4:
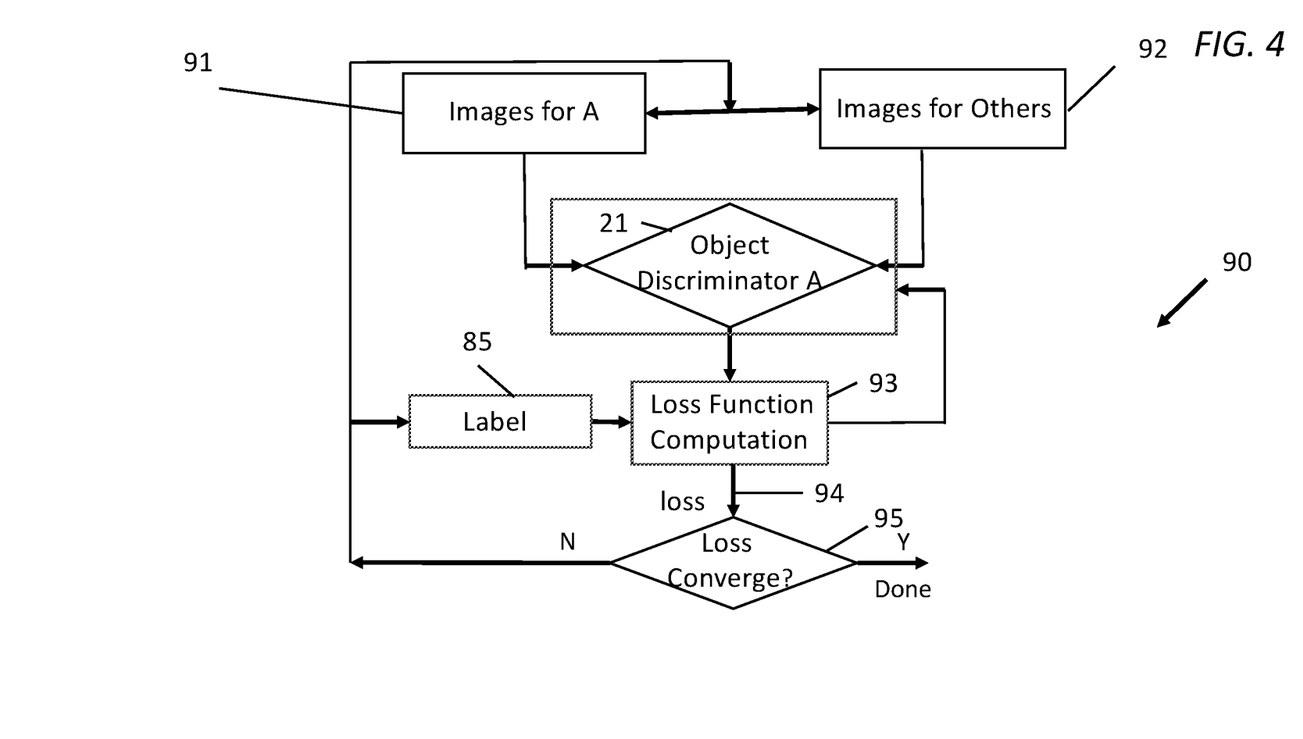
FIG. 4 shows a flow diagram of an algorithm for training an object discriminator in accordance with an implementation.

FIG. 4 is an illustration of a flow diagram 90 of an algorithm for training the object discriminator. The object discriminator 21 receives images of a particular person A 91 and images for other persons in the group 92. The computed loss 94 can be expressed by the following equation:

$$D\_loss = -mean(\log(D\_A) + \log(1.-D\_others))$$

where $D\_A = D(x)$ is the discriminator output for images of person A in a group; $D\_others = D(y)$ is the discriminator output for the images of other persons in a group; and the mean loss is taken over a batch of training samples.

The loss 94 is evaluated for convergence 95. If the loss 94 converges to a stable value, then the training process ends; otherwise, the iteration cycles continue with additional set of training data. This training process results in an object discriminator that only recognizes person A and discriminates from the other persons in that group. Note, the images 91 and 92 are generated using a first set of generators or real images for the purpose of training the object discriminator. A second set of generators derived in the same way as the first set to generate the images or real images is required for classification of unknown images as illustrated in FIG. 1 for security entry system 12.

Figure 5:
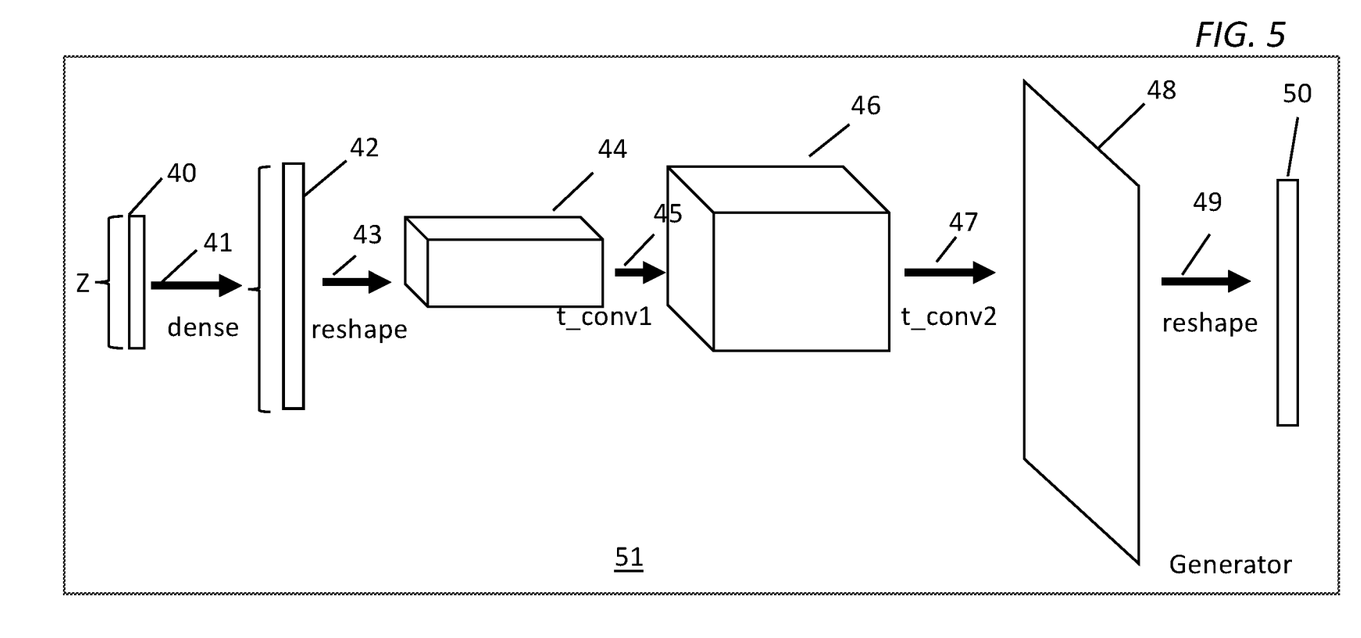
FIG. 5 illustrates operation of a generator in accordance with an implementation.

FIG. 5 is an illustration of the generator block diagram 51. For example, generator 51 is a Deep Convolutional Generative Adversarial Networks (DCGAN) used for machine learning. For information on DCGAN, see for example A. Radford and L. Metz, "Unsupervised Representation Learning with Deep Convolutional Generative Adversarial Networks," ICLR 2016, arXiv:1511.06434v2 [cs.LG] 7 Jan. 2016.

In FIG. 5, the noise source 40 illustrated as Z represents a tensor in which each element is a randomly distributed white noise between −1 and 1. The noise 40 is feed into a dense deep neural network (DNN) 41 to produce an output tensor 42. The output tensor 42 is reshaped 43 into an output tensor 44. Tensor 44 is processed by a first transpose convolution neural network t_conv1 45 to give an output tensor 46. Tensor 46 is processed by a second transpose convolution neural network t_conv2 47 to give an output tensor 48. Finally, the output tensor 48 is reshape to an output tensor 50. Tensor 50 is a representation of the generated image 17 illustrated in FIG. 1.

In the preferred embodiment, generator 51 is a derived generator from GAN with a relatively shallow neural network consisting of a smaller number of transpose convolution layers (2 illustrated) than DCNN with a larger number of layers that is used in a typical generator implementation for a large group of objects as described in A. Radford and L. Metz, "Unsupervised Representation Learning with Deep Convolutional Generative Adversarial Networks," ICLR 2016, arXiv:1511.06434v2 [cs.LG] 7 Jan. 2016. The reason that a shallow neural network is used is because the generator 51 is dedicated to generating a single person's image rather than many persons.

As will be apparent to those skilled in the art, the generator is not limited to the embodiment illustrated in FIG. 5. For example, the number of transpose convolutional neural network layers (2 illustrated) can be increased or replaced by a convolutional neural network. Other well-known processing elements in the field of machine learning, such as max pooling, dropout, softmax, etc. can be added according to the image processing required to optimize the generated images.

DCGAN is also known for its feature learning capability as described in A. Radford and L. Metz, "Unsupervised Representation Learning with Deep Convolutional Generative Adversarial Networks," ICLR 2016, arXiv: 1511.06434v2 [cs.LG] 7 Jan. 2016. In this disclosure, a GAN is used to enhance the image features to improve classification accuracy. This image feature enhancement is embodied in an optimized GAN generator by capturing the major features autonomously from an object to generate a large training data set that contains these feature enhancements. These generated images are used to train the object discriminators to improve classification accuracy. For example, image generator 16 is trained to generate feature enhanced facial images by extracting autonomously features that are unique to a particular person.

Generator 51 does not suffer from mode collapse, an issue that often arises in GAN generators where only one image of the object can be generated, see for example, L. Metz, B. Poole, D. Pfau, J. Sohl-Dickstein, "Unrolled Generative Adversarial Networks," LCLR 2017, arXiv:1611.02163v4 [cs.LG] 12 May 2017. The generator 51 can be used to generate many high-quality fake images of the real object. Instead of storing the actual real images, a small set of generator model parameters can be stored and used to generate the fake images. Therefore, the generator 51 is an efficient method for image storage resulting in orders of magnitude reduction in the image data storage sizes.

Figure 6:
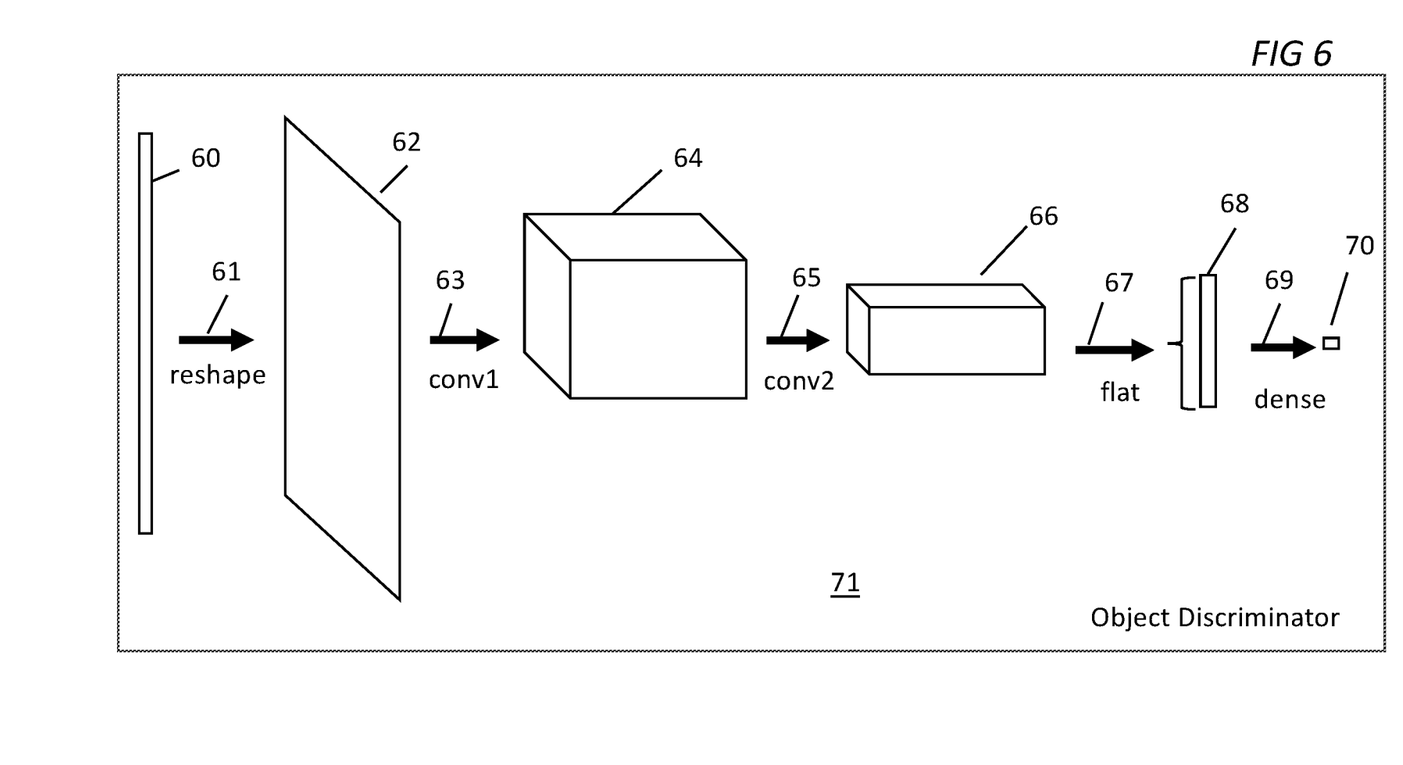
FIG. 6 illustrates operation of a discriminator in accordance with an implementation.

FIG. 6 is an illustration of the discriminator block diagram 71. The preferred embodiment of the object discriminator 71 consists of input image 60. The input image 60 is reshaped 61 and feed into a first convolutional neutral network (CNN) conv1 63 to produce an output tensor 64. The output tensor 64 is feed into a second CNN conv2 65 to produce an output tensor 66. The output tensor 66 is flattened 67 into an output tensor 68. The output tensor 68 is feed into a dense deep neutral network (DNN) 69 to produce an output tensor of dimension 1 which in the case of GAN training has a logic value of one if the input 60 is a real image or a logic value of zero if the input 60 is a generated fake image. Also, during object discriminator training, a first set of images are divided into a first subset having images for a particular person and a second subset having images for other persons in the group to train an object discriminator to recognize the particular person and discriminate from the other persons in the group. For example, input of images from the first subset causes a logic one output and wherein input of images from the second subset causes a logic zero output.

In the preferred embodiment, object discriminator 71 is a relatively shallow neural network consisting of a smaller number of convolution layers (2 illustrated) than a deep convolution network with a larger number of layers that is used in a state of art classification implementation for a large group of objects. The reason that a shallow neural network is used is because it is dedicated to classifying a single person rather than many persons. In this disclosure, the classification for a large group is accomplished by the parallel architecture illustrated in FIG. 1 that replicates the group classifier 19 and train it for that group. Therefore, a scalable parallel classification architecture can be efficiently implemented in hardware by replicating the same hardware block 19 that can be implement as an integrated circuit block with dedicated neural network computation units. In such design, a large computation resource that is typical required for a software implementation of a very deep neural network for a large group classification is not required since the shallower neural network used in the object discriminator design is easier to train to recognize one person. The object discriminator 71 in the preferred embodiment can be the same type of design as the GAN discriminator 32 illustrated in FIG. 2, but not necessarily.

It should be apparent to those skilled in the art that the generator is not limited to the embodiment illustrated in FIG. 6. For example, the number of convolutional neural network layers (2 illustrated) can be increased or replaced by a fully connected deep neural network type. Other well-known processing elements in the field of machine learning, such as max pooling, dropout, softmax, etc. can be added according to the type of image processing required to optimize the classification.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An image classification system, comprising:
   a camera system that captures an image of a face;
   an image generator that receives the image and generates a feature-enhanced image; and
   a classifier that includes:
      a plurality of group classifiers, each group classifier in the plurality of classifiers including:
         a group discriminator that determines, based on the feature-enhanced image, whether the image of the face belongs to a group of persons associated with the group discriminator, and
         a plurality of object discriminators, each object discriminator being associated with a single person within the group of persons wherein when the group discriminator determines that the image of the face belongs to the group of persons, the object discriminator determines whether the image of the face belongs to the single person associated with the object discriminator, wherein the plurality of object discriminators are on standby and powered down when the group discriminator determines the image of the face does not belong to the group of persons associated with the group discriminator.

2. An image classification system as in claim 1, wherein the plurality of group classifiers are connected and function in parallel to allow parallel classification of the image of the face.

3. An image classification system as in claim 1, wherein the plurality of object discriminators are connected and function in parallel to allow parallel discrimination of the image of the face.

4. An image classification system as in claim 1, wherein the image of the face is generated at the time a person is seeking entrance to a secured area.

5. An image classification system as in claim 1, wherein the image generator is a shallow transpose convolutional neural network consisting of layers trained to generate multiple images of a single person.

6. An image classification system as in claim 1, each group classifier in the plurality of group classifiers is implemented as a separate integrated circuit block with neural network computation units.

7. An image classification system, comprising:
   a camera system that captures an image of a face;
   an image generator that receives the image and generates a feature-enhanced image; and
   a classifier that includes:
      a plurality of group classifiers, each group classifier in the plurality of classifiers including:
         a group discriminator that determines, based on the feature-enhanced image, whether the image of the face belongs to a group of persons associated with the group discriminator, and
         a plurality of object discriminators, each object discriminator being associated with a single person within the group of persons wherein when the group discriminator determines that the image of the face belongs to the group of persons, the object discriminator determines whether the image of the face belongs to the single person associated with the object discriminator, wherein each object discriminator in the plurality of object discriminators is a shallow convolutional neural network consisting of layers trained to classifying multiple images of a single person.

8. An image classification system, comprising:
   a camera system that captures an image of a face;
   an image generator that receives the image and generates a feature-enhanced image; and
   a classifier that includes:
      a plurality of group classifiers, each group classifier in the plurality of classifiers including:
         a group discriminator that determines, based on the feature-enhanced image, whether the image of the face belongs to a group of persons associated with the group discriminator, and
         a plurality of object discriminators, each object discriminator being associated with a single person within the group of persons wherein when the group discriminator determines that the image of the face belongs to the group of persons, the object discriminator determines whether the image of the face belongs to the single person associated with the object discriminator;
   wherein the image generator is trained within a generative adversarial network using a set of facial image data from persons within the group of persons.

9. An image classification system as in claim 8, wherein the image generator is trained to generate feature enhanced facial images by extracting autonomously features that are unique to a particular person.

10. An image classification system as in claim 8, wherein during training a set of images are generated from a noise source.

11. An image classification system as in claim 8, wherein during training
   a first set of generated images are divided into a first subset having images for a particular person and a second subset having images for other persons in the group to train an object discriminator to recognize the particular person and discriminate from the other persons in the group.

12. An image classification system as in claim 11, wherein input of images from the first subset causes a logic one output and wherein input of images from the second subset causes a logic zero output.

13. A biometric classification system, comprising:
   a biometric capture system that captures a biometric identifier;
   a classifier that includes:
      a plurality of group classifiers, each group classifier in the plurality of classifiers including:
         a group discriminator that determines, based on the biometric identifier captured by the biometric capture system, whether the captured biometric identifier indicates a group of persons associated with the group discriminator, and
         a plurality of object discriminators, each object discriminator being associated with a single person within the group of persons wherein when the group discriminator determines that the captured biometric identifier indicates the group of persons, the object discriminator determines whether the captured biometric identifier indicates the single person associated with the object discriminator; and
   a biometric generator that is trained within a generative adversarial network using a set of biometrics from persons within the group of persons, the biometric generator enhancing biometrics captured by the biometric capture system.

14. A biometric classification system as in claim 13, wherein the captured biometric identifier is one of the following:
- an image of a face;
- a fingerprint;
- a retina scan;
- a voice pattern;
- a body motion pattern.

15. A biometric classification system as in claim 13, wherein the plurality of group classifiers are connected and function in parallel to allow parallel classification and wherein the plurality of object discriminators are connected and function in parallel to allow parallel discrimination.

16. A biometric classification system as in claim 13, wherein each object discriminator in the plurality of object discriminators is a shallow convolutional neural network consisting of layers trained to classifying multiple images of a single person.

17. A biometric classification system as in claim 13, wherein each group classifier in the plurality of group classifiers is implemented as a separate integrated circuit block with neural network computation units.

18. An image classification system, comprising:
a camera system that captures an image of a face;
an image generator that receives the image and generates a feature-enhanced image; and
a classifier that includes:
  a plurality of group classifiers, each group classifier in the plurality of classifiers including:
    a group discriminator that determines, based on the feature-enhanced image, whether the image of the face belongs to a group of persons associated with the group discriminator, and
    a plurality of object discriminators, each object discriminator being associated with a single person within the group of persons wherein when the group discriminator determines that the image of the face belongs to the group of persons, the object discriminator determines whether the image of the face belongs to the single person associated with the object discriminator;
wherein the image generator stores a set of model parameters that can be used to generate a set of images, wherein the set of model parameters is numerically smaller than the set of images.

* * * * *